United States Patent Office 3,159,624
Patented Dec. 1, 1964

3,159,624
SUBSTITUTED PYRUVIC ACID ESTERS AND 3-AMINO-5-HYDROXY - 6 - (SUBSTITUTED ETHE-NYL)-1,2,4-TRIAZINES PREPARED THEREFROM
Yutaka Kodama, Isamu Saikawa, and Toyoo Maeda, all of Toyama-shi, Japan, assignors to Toyama Kagaku Kogyo Kabushiki Kaisha, Tokyo, Japan, a corporation of Japan
No Drawing. Filed Nov. 15, 1961, Ser. No. 152,637
Claims priority, application Japan July 17, 1961
5 Claims. (Cl. 260—240)

This invention relates to 3-amino-5-hydroxy-6-(5'-nitro-furylethenyl)-1,2,4-triazine and its addition salts and includes processes for making the compounds, together with an intermediate compound required in the process. The invention also includes the corresponding compounds of the thiophene and benzene series.

We have found that the 5-nitrofuran aminatriazine compound set out above and its addition salts of physiologically acceptable acids have high antibacterial activity. For example, they are effective against *Escherichia coli* in amounts running from 10 to 20 p.p.m.

The process involves the reaction of the nitrofurfurylidene, nitrothenylidene and nitrobenzylidine esters with aminoguanidine to form the guanyl hydrazones. These compounds are then cyclized to the corresponding 3-amino-5-hydroxy-1,2,4-triazines. The sequence can be shown as follows, using the 5-nitrofurfurylidene pyruvic ester as a starting material:

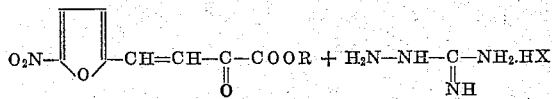

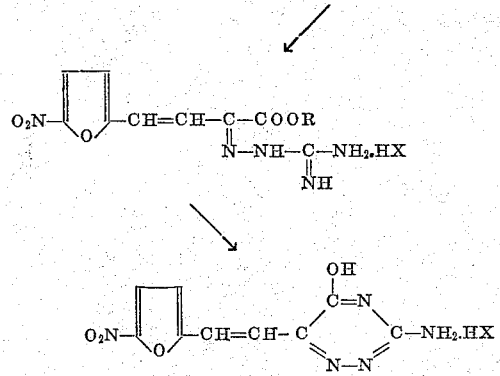

R stands for an alcohol residue which, since it is eliminated in the reaction, is not particularly material. In the specific examples, the ethyl ester will be illustrated but is does not have anything particular to do with the present invention. Any ester operates in the same manner. The only difference is the by-product alcohol produced which does not affect the reaction. Therefore, the ester may be of any of the ordinary esters, such as methyl, ethyl, butyl or higher alkyls, such as octyl. The aryl and aralkyl esters such as phenyl and benzyl esters are included as is tetrahyfurfuryl ester.

In the final step of ring closure, a condensing agent has to be used. Acid condensing agents are preferred. Typical examples of condensing agents are sulfuric acid, phosphoric acid, benzenesulfonic acid, toluenesufonic acid, and the acid salts of alkali metals, such as bisulfate, acid phosphate, etc.

While not entering into the reaction, it is desirable to use inert organic liquids to render the reaction medium more easily stirrable. The particular liquid used is not important so long as it is relatively inert. For example, the alcohols, dioxane, dimethylformamide, tetrahydrofuran, tetrahydrofurfuryl alcohol, and the like may be used.

The invention will be described in greater detail in conjunction with the following specific examples, the parts being by weight unless otherwise specified.

Example 1

3.5 parts of 5-nitrofurfurylidene-pyruvic acid ethyl ester, which is prepared by nitrating the furfurylidene pyruvic acid ester with nitric acid and acetic anhydride, are dissolved in 20 parts of ethyl alcohol using gentle heat. The solution is then acidified with hydrochloric acid and 2 parts of amino-guanidine hydrochloride dissolved in ethyl alcohol are added. The mixture is reheated and refluxed until the reaction is complete and is then cooled. Yellow crystalline needles separate out in a very high yield. They correspond to the hydrochloride of the guanyl hydrazone. The hydrochloride has a decomposition point about 300° C. when it has been purified by recrystallization from alcohol.

It is possible to prepare the base by dissolving the hydrochloride in water and neutralizing with ammonia. The base is a reddish orange colored compound which also decomposes at temperatures above 300° C.

Example 2

Three parts of 5-nitrofurfurylidene-pyruvic acid ethyl ester are dissolved in 20 parts of ethyl alcohol with gentle heat. To the resulting solution there are then added 1.9 parts of aminoguanidine nitrate with just enough nitric acid to render the mixture acid. This requires only a minute amount of nitric acid. The mixture is then heated at reflux until the reaction is complete and on cooling yellow crystalline needles of the nitrate of the guanyl hydrazone precipitate out in high yield. Their decomposition point is about 163° C.

Example 3

1.5 parts of the product of Example 1 are dissolved in a mixture of 20 parts of ethyl alcohol and 10 parts of dimethylformamide using gentle heating. Then 0.2 part of sodium acid phosphate are added and the mixture heated at reflux until the reaction is complete. At this time, the hot reaction mixture is a clear solution, from which a yellow crystalline mass separates out on cooling.

The yellow crystals are recovered by filtration, suspended in water and then treated with ammonia to produce a reddish orange colored base which can be purified by recrystallizing from dimethylformamide and form a crystalline powder decomposing at temperatures above 310° C. The compound corresponds to 3-amino-5-hydroxy-6-(5'-nitrofurylethenyl)-1,2,4-triazine and its salt, depending on whether the base or the salt is produced.

The base can be acetylated by heating with acetic anhydride in dimethylformamide solution at about 100° C. A monoacetyl derivative is obtained in the form of yellow crystalline needles.

Example 4

One part of the free base produced in Example 1 is dissolved in 20 parts of dioxane with gentle heating and about 1 part of 40% sulfuric acid added. The mixture is heated at reflux until reaction is complete and then allowed to cool, a yellow crystalline product gradually separating out. The yellow crystals are recovered by filtration, washed well with alcohol and constitute the sulfate of the amino hydroxy triazine. This compound decomposes at about 274° C.

Example 5

5-nitrothenylidene-pyruvic acid ethyl ester guanyl hydrazone is prepared in a manner similar to that used for the preparation of the 5-nitrofurfurylidene-pyruvic acid ethyl ester guanyl hydrazone in Example 1. One part of this thenylidene-pyruvic acid ethyl ester guanyl hydrazone is dissolved in 20 parts of dioxane with gentle heating and 1 part of 40% sulfuric acid is added. The mixture is heated at reflux until reaction is complete and then allowed to cool. A yellow crystalline product precipitates. It is separated by filtration and washed well with alcohol. This is the sulfate of 3-amino-5-hydroxy-6-(5'-nitrothienyl)-1,2,4-triazine.

Example 6 p-Nitrobenzaldehyde is converted to p-nitrobenzylidene-pyruvic acid ethyl ester. This ester is then converted to the guanyl hydrazone by a procedure similar to that used in Example 1. This guanyl hydrazone is then converted to the sulfate of 3 - amino - 5 - hydroxy-(6-p-nitrostyryl)-1,2,4-triazine by a procedure similar to that in Example 4.

We claim:

1. A compound selected from the group consisting of compounds of the formula:

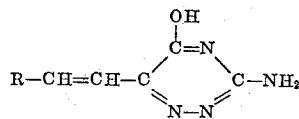

in which R is selected from the group consisting of nitrofuryl, nitrothienyl and nitrophenyl and their acid addition salts of physiologically acceptable acids.

2. The compound having the following formula:

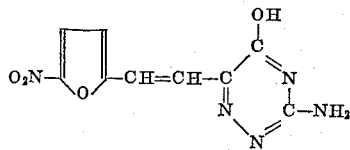

3. The compound having the following formula:

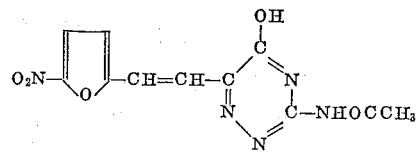

4. A compound of the following formula:

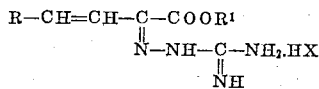

in which R is selected from the group consisting of nitrofuryl, nitrothienyl and nitrophenyl; $R^1$ is selected from the group consisting of alkyl, phenyl, benzyl and tetrahydrofurfuryl and X is the anion of a physiologically acceptable acid.

5. A compound according to claim 4 in which R is 5-nitrofuryl.

References Cited in the file of this patent

Dann et al.: "Chemische Berichte," vol. 82, pp. 81–89 (1949), QD 1–D4.

Erickson et al.: "The 1,2,3, and 1,2,4,-Triazines, Tetrazines and Pentazines," Interscience Pub. Inc., N.Y. 1956, pp. 54–56 and 68–71. QD 401E7.

Miura et al.: "Kanazawa Daigaku Yakugakubu Kenkyu Nempo," vol. 11, pp. 9–29 (1961) (as abstracted in Chemical Abstracts, vol. 56, columns 4766h–4767d (1962), QD 1 A51).